April 13, 1943.    C. S. JOHNSTON    2,316,592
RAILWAY CAR TRUCK
Filed Nov. 19, 1941    2 Sheets-Sheet 2
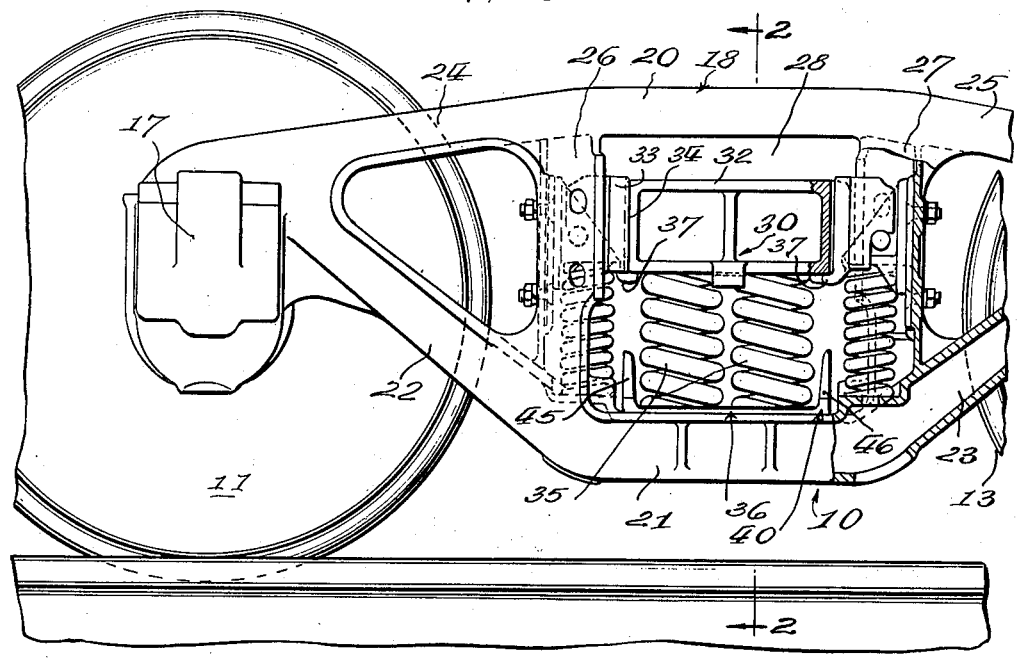
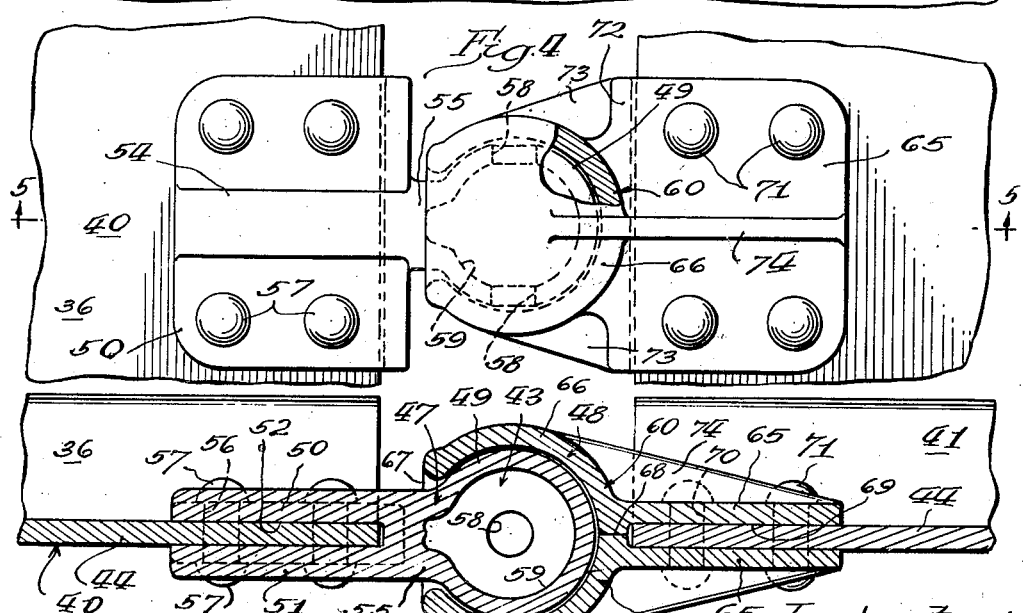

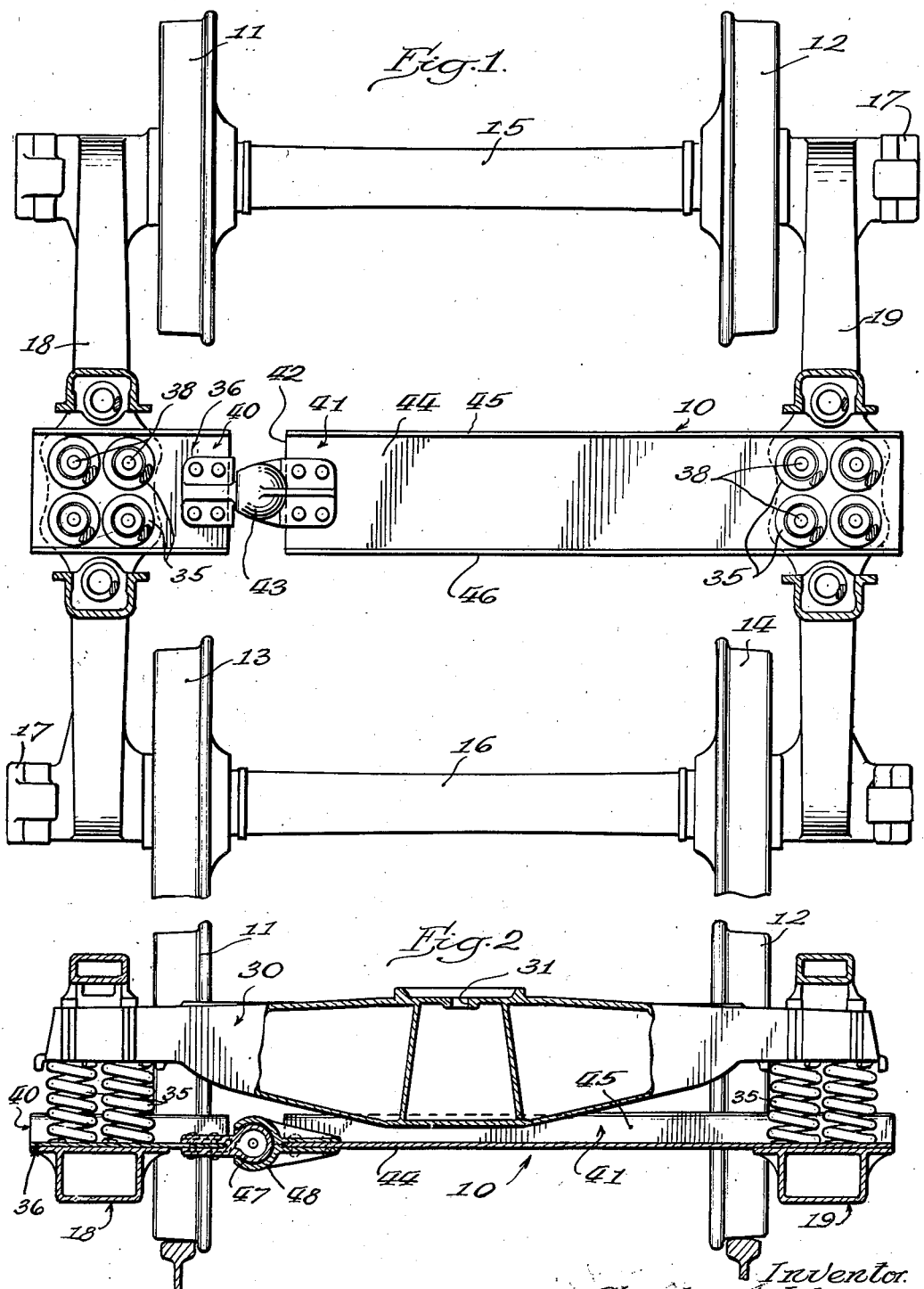

Patented Apr. 13, 1943

2,316,592

UNITED STATES PATENT OFFICE 2,316,592

RAILWAY CAR TRUCK

Charles S. Johnston, Glencoe, Ill., assignor to Transportation Specialties Company, Chicago, Ill., a corporation of Illinois Application November 19, 1941, Serial No. 419,679

2 Claims. (Cl. 105—208.2)

The present invention relates to railway car trucks, and is particularly concerned with improvements in the structure of the spring planks for the railway car trucks, and in the assembly of the trucks due to the use of the improved spring planks.

In the devices of the prior art the car trucks employ a channeled steel member as a spring plank, and this plank rests on the side frames of the truck and supports a plurality of springs at each end. The springs in turn support the bolster at each of its ends, and the bolster is secured to the car frame. The spring planks of the prior art break very frequently, and it is quite expensive to make a replacement of such planks as it involves the removal of the truck from under the car.

The car trucks undergo many different movements during traffic, and the spring planks are subjected to many different kinds of strains. When the brakes are applied to the wheels and the wheels tend to stop, the car structure, due to its inertia, tends to continue its motion with its load, and this is a source of strain on the connection between the wheels and the car.

When the car is going around a curve, one track is longer than the other, and one or both of the wheels must slip against the rails, since they are rigidly connected by the axle. This may place a greater drag on one wheel than the other, and cause a strain on the spring plank.

When one side of the track is higher than the other, additional and different strains are placed on the spring plank. The starting and stopping and bouncing of the loaded or empty car when it is in motion cause additional strain.

One of the objects of the present invention is the provision of an improved truck assembly in which the spring plank is adapted to perform its functions without the breakage which has resulted in the spring planks of the prior art.

Another object of the invention is the provision of an improved truck assembly including a spring plank which connects or ties the side frames together, and which is also adapted to permit the relative movement of the side frames in other directions while still holding the side frames at a definite distance from each other.

Another object of the invention is the provision of an improved spring plank structure for railway car trucks which is equally adapted to be used on existing cars and new cars, and which in fact, may be applied to any spring plank of the prior art which has been broken in use.

Another object of the invention is the provision of an improved spring plank adapted to tie the side frames together, and adapted to absorb shocks in all other directions so as to prevent breakage of the spring plank.

Another object of the invention is the provision of an improved spring plank which permits a limited amount of universal movement between the side frames of a railway car truck, but which is adapted to hold the side frames in definite spaced relation to each other so that the journal bearings will be properly positioned for engagement with the journals of the wheels.

Other objects and advantages of the invention will be apparent from the following description and the accompanying drawings, in which similar characters of reference indicate similar parts throughout the several views.

Referring to the drawings, of which there are two sheets:

Fig. 1 is a top plan view of a portion of a railway car truck taken on a plane located above the spring plank, but below the bolster, showing the structure of the improved spring plank embodying the invention;

Fig. 2 is a vertical sectional view taken on the plane of the line 2—2 of Fig. 3;

Fig. 3 is a side elevational view of a railway car truck showing a side frame and wheel, and the relation of these parts to the spring plank, portions of the structure being broken away;

Fig. 4 is a fragmentary top plan view of the ball-and-socket connection of the two parts of the improved spring plank;

Fig. 5 is a fragmentary vertical sectional view taken on the plane of the line 5—5 of Fig. 4, looking in the direction of the arrows.

Referring to Figs. 1 to 3, 10 indicates in its entirety a truck assembly shown in Fig. 1, which is supported upon pairs of wheels 11, 12 and 13, 14. The wheels are joined by the axles 15, 16, and are provided with journals which are rotatably mounted in the journal boxes 17. The journal boxes 17 are in each case carried by the ends of the side frames 18, 19. The side frames 18, 19 are preferably metal members in the form of a truss having the upper frame member 20 and lower frame member 21, the diagonally extending lower frame members 22, 23, and the downwardly sloping but nearly horizontal upper frame members 24, 25 joined to the frame members 22, 23, respectively.

The upper and lower frame members 20, 21 are joined by vertical frame members 26 and 27 forming a recess 28 or aperture in the truss frame 18 or 19 within which the bolster, spring plank and springs are received.

So far, the structure described may be the same as in the railway car trucks of the prior art, and the improvement herein consists in an improved spring plank structure and its combination with the other elements of the truck assembly.

The bolster which is seen in side elevation in Fig. 2 is indicated by the numeral 30, and it comprises a hollow metal beam which is adapted to be secured to the framework of the car, with a limited pivotal movement brought about by means of the attachment of the bolster pivotally at its upper center 31. At each end the bolster is reduced in size, and has the shape of an open ended box portion 32 of substantially rectangular form as shown in Fig. 3.

This box portion 32 is formed with two laterally projecting guide ribs 33 at each side for engaging on both sides of a vertical guide member 34 which is carried by the side frame 18 or 19.

Thus the bolster is mounted for vertical sliding movement with respect to the side frame. It is supported on the side frame by means of the helical coil springs 35 which are usually four in number on each side frame, and the springs 35 have their lower ends resting on the web of a spring plank 36.

The bolster is provided on its lower surface of the box-like portion 32, with depending ribs or lugs 37 serving to center and hold the springs in proper position under the bolster. Likewise, the springs may be held in proper place on the spring plank 36 by any suitable guide means such as, for example, an upwardly projecting lug 38 inside each spring.

The other details of the side frame shown in Fig. 3 may be varied considerably within the scope of the invention, as the present spring plank may be applied to various types of truck structures. The one which is illustrated happens to be one of the stabilized truck type.

The improved spring plank 36 which forms the subject of the present invention comprises a pair of channel members 40, 41, which may be of the same size, strength and shape as the spring planks of the prior art which they are intended to replace. In fact, when a spring plank of the prior art breaks, and if the break is at a proper place, such as one side of the bolster, a section equivalent to the space 42 between the sections 40, 41 may be cut out and replaced with the ball-and-socket joint illustrated in its entirety at 43.

Thus each of the channeled members 40, 41 has a web 44 and a pair of upwardly extending side flanges 45, 46. The web 44 of the section 40 has its lower side in engagement with the top of the lower frame member 21 of the side frame 18, to which it may be secured by welding, riveting, or other convenient fastening means.

In the same way, the web of the section 41 has its right end (Fig. 1) resting upon the lower frame member of the side frame 19, to which it is similarly secured. The overall length of the spring plank 36 is the same as in the spring planks of the prior art which it may replace.

In the space 42 between the sections of the spring blank 36, these sections are joined by means of the ball-and-socket joint 43, the structure of which is best shown in Figs. 4 and 5. For example, these may consist of metal members such as drop forgings of steel, and may comprise the ball member 47 and the socket member 48.

The ball member may be provided with a ball 49 and with upper and lower attaching flanges 50, 51. The upper and lower flanges 50, 51 are spaced from each other by a slot 52 of a size adapted to have a tight fit on the web 44 of section 40.

As shown in Fig. 4, the attaching flanges 50, 51 carry an upwardly extending rib 54 above and below these flanges, and extending axially of the flanges and ball 49. This rib serves to provide the flanges with a firmer connection to an enlarged shank 55 between the ball and the flanges. The shank 55 may be substantially cylindrical.

The flanges 50, 51 are provided with four apertures 56 for receiving the rivets 57 which secure the flanges to the web 44. The shank 55 supports the integral ball 49, which is spherical in shape, and which may be provided with cylindrical bores 58 oppositely located. The ball 49 is hollow, its spherical recess being indicated by the numeral 59.

The socket member 48 preferably comprises a pair of similar parts 60, 61. These parts are the same in shape and structure but they are oppositely located, and the lower one may be provided with a threaded through bore 63 for receiving any standard type of pressure lubricant fitting 64. Each socket part 60, 61 is formed with an attaching flange 65, and with a partially spherical shell 66 forming a part of the ball socket 48.

The ball shell 66 comprises half of a spherical shell, except that there is an opening at 67 in the socket member 48 which has a clearance around the shank 55. This opening is evidenced in each of the socket parts 60 and 61 by a trough-shaped opening in the end of each half shell.

The shells 66 are so arranged that when they fit together at the plane surface 68, there is a slot 69 formed between the attaching flanges 65 of the upper and lower parts 60 and 61.

Like the slot 53, the slot 69 fits the web 44 of the other section 41. Again the web 44 and the attaching flanges 65 are provided with registering apertures 70 for receiving the four rivets 71 which secure the parts of the shell together, and secure them to the web of the section 41.

The abutting surfaces 68 on each of the shells comprise a portion of an annulus, but each of the parts 60, 61 also has a transversely extending rib portion 72 which abuts against a similar portion on the other of these parts.

The rib portion 72 is joined to the outside of the ball shell 66 on each side by a reinforcing flange 73, which may engage a similar reinforcing flange 73 on the other part 61. The attaching flanges 65 are also preferably provided with triangular reinforcing ribs 74 which extend longitudinally of the socket member 48 and join the attaching flanges 65 to the shell 66.

While a slight clearance is shown in the drawings between the ball and the socket at 75, these complementary surfaces on the ball and socket are preferably in tight engagement with each other so that there can be no rattling because the ball is frictionally engaged in its socket. The friction may be reduced by solid lubricant applied through the fitting 64.

Referring to Fig. 1 it will be noted that the ball-and-socket is arranged at one side of the car truck so that the section 40 is short and the section 41 is longer. The reason for this will be evident from Fig. 2 where it will be seen that there is insufficient clearance between the web 44 of the spring beam and the lower part of the bolster for a ball-and-socket in the middle of the railway car truck, or midpoint between the ends of the spring plank. Therefore, it is desirable to locate the ball-and-socket toward one side of the car truck, making one section of the spring plank long and the other one short, in order that the ball-and-socket may be located where it has a suitable clearance with the lower surface of the bolster.

The operation of the present spring plank and truck assembly is as follows: Relative twisting motion between the ends of the spring plank is permitted by the ball-and-socket joint, thereby relieving the spring plank of this strain entirely. This may take place when one of the four wheels passes over a bump so that it is elevated, while the other three wheels remain in the same plane.

The side frames 18 and 19 are held in accurate spaced relation to each other by the bolster and its guides, and by the spring plank. Any bending stresses in the spring plank which are caused by a drag on one pair of wheels in excess of that on the other, causes a limited movement of the sections of the spring plank at the universal joint.

Thus the present spring plank is adapted to absorb the shocks and bumps, and relieve the strains which have been causing breakage of the spring planks of the prior art which consisted of one rigid channel member.

When one of the existing devices has broken, a section of it may be cut out at the break, and the present construction installed by fastening the broken sections together by a ball-and-socket construction according to the invention.

In some embodiments of the invention I may dispense with lubrication and utilize the friction between the ball-and-socket for absorbing shocks or bumps or strains.

While I have illustrated a preferred embodiment of my invention, many modifications may be made without departing from the spirit of the invention, and I do not wish to be limited to the precise details of construction as set forth, but desire to avail myself of all changes within the scope of the appended claims.

Having thus described my invention, what I claim as new and desire to secure by Letters Patent of the United States is:

1. A ball-and-socket connection for railway car truck spring planks comprising a ball member and a socket member, said ball member and socket member each being provided with attaching flanges separated by a slot, said slot being of sufficient width to embrace the web of a channeled spring plank, and said socket member being made of two separate parts secured together to form a socket when they have their attaching flanges secured to the web of a spring plank section.

2. A spring plank for railway car trucks comprising a channeled metal member having a web and side flanges adapted to be rigidly secured to the side frame of a truck at each of its ends to hold the side frames in spaced relation to each other, said member comprising a pair of sections, one section being longer than the other to locate the joint between the sections laterally of the middle of the truck, and said sections being joined together by a ball and socket connection comprising a ball member and a socket member, said ball member and socket member each being provided with attaching flanges separated by a slot, said slot being of sufficient width to embrace the web of said spring plank and said socket member being made of two separate parts secured together to form a socket when they have their attaching flanges secured to the web of said spring plank section.

CHARLES S. JOHNSTON.